(12) United States Patent
Hazell et al.

(10) Patent No.: US 11,518,873 B2
(45) Date of Patent: Dec. 6, 2022

(54) CURABLE COMPOSITIONS

(71) Applicant: ARKEMA FRANCE, Colombes (FR)

(72) Inventors: Thomas W. Hazell, Coatesville, PA (US); William Wolf, Philadelphia, PA (US); Florian J. David, Philadelphia, PA (US)

(73) Assignee: Arkema France, Colombes (FR)

( * ) Notice: Subject to any disclaimer, the term of this patent is extended or adjusted under 35 U.S.C. 154(b) by 658 days.

(21) Appl. No.: 16/462,573

(22) PCT Filed: Nov. 17, 2017

(86) PCT No.: PCT/EP2017/079664
§ 371 (c)(1),
(2) Date: May 21, 2019

(87) PCT Pub. No.: WO2018/095823
PCT Pub. Date: May 31, 2018

(65) Prior Publication Data
US 2019/0315959 A1    Oct. 17, 2019

Related U.S. Application Data

(60) Provisional application No. 62/426,783, filed on Nov. 28, 2016.

(51) Int. Cl.
| | | |
|---|---|---|
| *C08L 33/14* | (2006.01) | |
| *C08F 220/06* | (2006.01) | |
| *B33Y 10/00* | (2015.01) | |
| *B33Y 70/00* | (2020.01) | |
| *B29C 64/124* | (2017.01) | |
| *C09D 4/06* | (2006.01) | |
| *C09D 133/14* | (2006.01) | |
| *C09J 4/06* | (2006.01) | |
| *C09J 5/00* | (2006.01) | |
| *C09J 133/14* | (2006.01) | |
| *C09K 3/10* | (2006.01) | |
| *B33Y 80/00* | (2015.01) | |
| *B29K 105/00* | (2006.01) | |

(52) U.S. Cl.
CPC ............ *C08L 33/14* (2013.01); *B29C 64/124* (2017.08); *B33Y 10/00* (2014.12); *B33Y 70/00* (2014.12); *C09D 4/06* (2013.01); *C09D 133/14* (2013.01); *C09J 4/06* (2013.01); *C09J 5/00* (2013.01); *C09J 133/14* (2013.01); *C09K 3/10* (2013.01); *B29K 2105/0085* (2013.01); *B33Y 80/00* (2014.12); *C08L 2205/025* (2013.01); *C09J 2301/416* (2020.08); *C09J 2433/00* (2013.01); *C09K 2200/0627* (2013.01)

(58) Field of Classification Search
CPC .............. C09K 2200/0627; C09K 3/10; C09J 2433/00; C09J 2301/416; C09J 5/00; C09J 4/06; C09J 4/00; C09D 133/14; C09D 11/101; C09D 4/06; C09D 4/00; C08L 2205/025; C08L 33/14; C08F 265/06; C08F 222/106; C08F 222/102; C08F 220/20; C08F 220/06; C08F 8/42; B33Y 80/00; B33Y 70/00; B29K 105/0085; B29C 64/124; B29C 64/106
See application file for complete search history.

(56) References Cited

U.S. PATENT DOCUMENTS

| | | |
|---|---|---|
| 3,899,382 A | 8/1975 | Matsuda et al. |
| 6,399,672 B1 | 6/2002 | Ceska et al. |
| 2007/0054969 A1 | 3/2007 | Bailey et al. |
| 2009/0004493 A1 | 1/2009 | Maier et al. |

FOREIGN PATENT DOCUMENTS

| | | |
|---|---|---|
| EP | 0863169 A2 | 9/1998 |
| WO | 2004072192 A1 | 8/2004 |

OTHER PUBLICATIONS

Polymer Properties Database from Crow from Polymerdatabase.com copyright 2015-2019. Downloaded Jan. 1, 2022 from <http//www.polymerbase.com>. (Year: 2019).*

* cited by examiner

*Primary Examiner* — Sanza L. McClendon
(74) *Attorney, Agent, or Firm* — Christopher R. Lewis

(57) ABSTRACT

Useful articles, such as coatings, adhesives, printed graphics, 3D printed articles and molded articles are prepared by curing compositions containing one or more salts of ethylenically unsaturated carboxylic acids comprising six or more carbon atoms, one or more multifunctional (meth)acrylate oligomers and one or more mono(meth)acrylate esters of alcohols which, when polymerized as homopolymers, have glass transition temperatures of at least 50° C.

26 Claims, No Drawings

CURABLE COMPOSITIONS

The present invention relates to compositions based on ethylenically unsaturated components (e.g., (meth)acrylate functionalized compounds) capable of being cured by free radical polymerization and other means to provide cured materials having improved properties.

Photo-curable resins are a type of thermoset polymer which harden when exposed to UV-light by forming a three dimensional network. Such thermoset polymers are inherently more brittle than thermoplastics since their mechanical properties arise from rigid cross-links rather than flexible entanglements. Hence, photo-curable compositions generally possess overall weaker mechanical properties and, especially, lower impact resistance at comparable material hardness. One way to overcome these issues is through the use of high-Tg (high glass transition temperature) mono-functional (meth)acrylate monomers, which impart a good balance of hardness and flexibility to the material. Unfortunately, such monomers also have the important disadvantage of being poorly reactive compared to multi-functional monomers.

Accordingly, it would be desirable to find a way to produce cured materials based on high Tg mono-functional (meth)acrylate monomers which are highly flexible and yet retain the hardness and rigidity typical of cured compositions based on such monomers. Such formulations would consequently possess a superior impact resistance as compared to conventional photo-curable systems.

Curable compositions have now been discovered which, despite containing high Tg mono-functional (meth)acrylate monomers, have a high degree of flexibility and impact resistance when cured, while retaining good hardness and rigidity. Such compositions use soluble metal salts to increase reactivity without compromising flexibility, which is the effect that conventional multi-functional monomers typically have in photo-curable compositions. Various aspects of the present invention may be summarized as follows:

Aspect 1: A curable composition comprised of, consisting essentially of or consisting of:
a) at least one salt of at least one ethylenically unsaturated carboxylic acid comprising six or more carbon atoms;
b) at least one multifunctional (meth)acrylate oligomer and
c) at least one mono(meth)acrylate ester of an alcohol which, when polymerized as a homopolymer, has a glass transition temperature of at least 50° C.

Aspect 2: The curable composition of Aspect 1, wherein the ethylenically unsaturated carboxylic acid is comprised of seven, eight, nine, ten, eleven, twelve, thirteen or more carbon atoms.

Aspect 3: The curable composition of Aspect 1 or 2, wherein the ethylenically unsaturated carboxylic acid contains at least one functional group selected from acryloyl, methacryloyl, allyl, propenyl and vinyl.

Aspect 4: The curable composition of any of Aspects 1-3, wherein the ethylenically unsaturated carboxylic acid is a (meth)acrylate-functionalized carboxylic acid.

Aspect 5: The curable composition of any of Aspects 1-4, wherein the at least one salt comprises, consists essentially of or consists of at least one polyvalent metal salt.

Aspect 6: The curable composition of any of Aspects 1-5, wherein the at least one salt comprises, consists essentially or consists of at least one zinc or calcium salt.

Aspect 7: The curable composition of any of Aspects 1-6, wherein the ethylenically unsaturated carboxylic acid is a half ester which is a reaction product of a hydroxy-functionalized ethylenically unsaturated compound and a polycarboxylic acid or carboxylic acid anhydride.

Aspect 8: The curable composition of any of Aspects 1-7, wherein the salt corresponds to Formula (I):

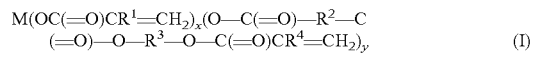

$$M(OC(=O)CR^1=CH_2)_x(O-C(=O)-R^2-C(=O)-O-R^3-O-C(=O)CR^4=CH_2)_y \quad (I)$$

wherein M is an element other than hydrogen of valence n, n=x+y, y=an integer of at least 1, $R^1$ and $R^4$ are the same or different and are H or $CH_3$ and $R^2$ and $R^3$ are the same or different and are divalent organic moieties each containing two or more carbon atoms.

Aspect 9: The curable composition of Aspect 8, wherein M is selected from the group consisting of Li, Na, K, Ce, Mg, Ca, Sr, Ba, Ti, Zr, V, Cr, Mo, W, Mn, Fe, Co, Ni, Pd, Cu, Zn, Cd, Hg, B, Al, Ga, In, Si, Ge, Sn, Pb, Sb and Bi.

Aspect 10: The curable composition of any of Aspects 1-9, wherein the at least one mono(meth)acrylate ester of an alcohol, when polymerized as a homopolymer, has a glass transition temperature of at least 75° C. as measured by Dynamic Mechanical Analysis in accordance with ASTM E1640-13.

Aspect 11: The curable composition of any of Aspects 1-10, wherein the at least one multifunctional (meth)acrylate oligomer is selected from the group consisting of urethane (meth)acrylates, epoxy (meth)acrylates, polyester (meth)acrylates, polyether (meth)acrylates and polycarbonate (meth)acrylates and combinations thereof.

Aspect 12: The curable composition of any of Aspects 1-11, wherein the at least one multifunctional (meth)acrylate oligomer comprises, consists essentially of or consists of at least one di(meth)acrylate-functionalized oligomer.

Aspect 13: The curable composition of any of Aspects 1-12, wherein the at least one multifunctional (meth)acrylate oligomer has a number average molecular weight of from about 1000 to about 10,000 daltons.

Aspect 14: The curable composition of any of Aspects 1-13, wherein the alcohol contains at least one of a cyclic structural moiety or a hydroxyalkyl structural moiety.

Aspect 15: The curable composition of any of Aspects 1-14, wherein the alcohol contains at least one of a cyclic structural moiety selected from the group consisting of aromatic groups and alicyclic groups.

Aspect 16: The curable composition of any of Aspects 1-15, wherein the alcohol contains at least one of a cyclic structural moiety selected from the group consisting of monocyclic, bicyclic, tricyclic, tetracyclic, pentacyclic and hexacyclic hydrocarbon radicals.

Aspect 17: The curable composition of any of Aspects 1-16, wherein the alcohol contains at least one of a cyclic structural moiety selected from the group consisting of isobornyl, cyclohexyl, tricyclodecanyl and phenyl.

Aspect 18: The curable composition of any of Aspects 1-17, wherein the salt is obtained by reacting a M-containing compound, wherein M is selected from the group consisting of Li, Na, K, Ce, Mg, Ca, Sr, Ba, Ti, Zr, V, Cr, Mo, W, Mn, Fe, Co, Ni, Pd, Cu, Zn, Cd, Hg, B, Al, Ga, In, Si, Ge, Sn, Pb, Sb and Bi, with a carboxylic acid corresponding to Formula (II):

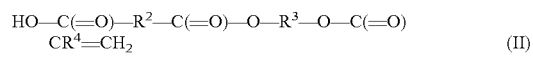

$$HO-C(=O)-R^2-C(=O)-O-R^3-O-C(=O)CR^4=CH_2 \quad (II)$$

wherein $R^4$ is H or $CH_3$ and $R^2$ and $R^3$ are the same or different and are divalent organic moieties each containing two or more carbon atoms.

Aspect 19: The curable composition of Aspect 18, wherein the M-containing compound is selected from the group consisting of M-containing oxides, M-containing halides, M-containing alkoxides, M-containing hydroxides, M-containing nitrates, M-containing sulfates, M-containing carboxylates, M-containing carbonates and combinations thereof.

Aspect 20: The curable composition of Aspect 18 or 19, wherein the M-containing compound is zinc oxide or calcium oxide.

Aspect 21: The curable composition of any of Aspects 18-20, wherein the salt is obtained by reacting the M-containing compound with both the carboxylic acid corresponding to Formula (II) and (meth)acrylic acid.

Aspect 22: The curable composition of any of Aspects 1-21, comprising, consisting essentially of, or consisting of 1 to 25% by weight a), 20 to 55% by weight b) and 25 to 60% by weight c), based on the total weight of a)+b)+c).

Aspect 23: A method of making a cured article, comprising curing a curable composition in accordance with any of claims 1-22.

Aspect 24: A method of making a three-dimensional article, comprising the steps of:
a) coating a first layer of a curable composition in accordance with any of Aspects 1-22 onto a surface;
b) at least partially curing the first layer to provide a cured first layer;
c) coating a second layer of the curable composition onto the cured first layer;
d) at least partially curing the second layer to provide a cured second layer adhered to the cured first layer and
e) repeating steps c) and d) a desired number of times to build up the three-dimensional article.

Aspect 25: The method of Aspect 24, wherein the curing steps are performed by exposing the layers of the curable composition to radiation.

Aspect 26: Use of a curable composition in accordance with any of Aspects 1-22 in a coating, an adhesive, a sealant, an ink, a 3D printing resin, a composite or a molding resin.

Aspect 27: A cured finished product obtained by curing a curable composition in accordance with any of Aspects 1-22.

Aspect 28: The cured finished product of Aspect 27, wherein the cured finished product is selected from the group consisting of coated articles, adhered articles, sealed articles, 2D printed articles, 3D printed articles, composites and molded articles.

Salts of Ethylenically Unsaturated Carboxylic Acids

The curable compositions of the present invention are characterized by the inclusion of one or more salts of ethylenically unsaturated carboxylic acids comprised of six or more carbon atoms. Such salts, by virtue of including at least one carboxylate group containing a relatively large number of carbon atoms, have increased solubility in organic media, in particular improved solubility in the other components of the curable composition (e.g., the multifunctional (meth)acrylate oligomer(s) and/or the mono(meth)acrylate ester(s) of alcohol(s)), as compared to analogous salts of shorter chain ethylenically unsaturated carboxylic acids such as (meth)acrylic acid. Salts of this type are sometimes referred to in the art as "oil-soluble". Generally speaking, the solubility of the salt in organic media will tend to increase as the number of carbon atoms is increased, although to some extent the solubility will also depend upon the type of structural moiety or types of structural moieties in which the carbon atoms are present, as well as other types of atoms and functional groups which may be present. In various embodiments of the invention, the ethylenically unsaturated carboxylic acid may, for example, contain six, seven, eight, nine, ten, eleven, twelve, thirteen, fourteen, fifteen or more carbon atoms. In other embodiments, the ethylenically unsaturated carboxylic acid contains no more than 30, no more than 25 or no more than 20 carbon atoms. The carbon atoms may be aliphatic carbon atoms (including carbon atoms participating in carbon-carbon double bonds), as well as aromatic carbon atoms.

Suitable ethylenically unsaturated carboxylic acids are carboxylic acids which contain at least one carbon-carbon double bond (i.e., at least one site of ethylenic unsaturation). Such double bonds render the salts of the ethylenically unsaturated carboxylic acid capable of participating in the reactions which occur when the curable composition is cured, which may involve, for example, a free radical or cationic polymerization mechanism. While any such carbon-carbon bond may be present, in various embodiments of the invention the carbon-carbon double bond(s) is or are furnished by one or more functional groups selected from the group consisting of acryloyl (—O—C(=O)CH=CH$_2$), methacryloyl (—O—C(=O)C(CH$_3$)=CH$_2$), maleyl (—O—C(=O)—CH=CH—C(=O)—O—), allyl (—CH$_2$—CH=CH$_2$), propenyl (—CH=CHCH$_3$) and vinyl (—CH=CH$_2$). Salts of (meth)acrylate-functionalized carboxylic acids are utilized in one embodiment of the invention.

In embodiments of the invention where the cation or cations which is or are the counterion(s) to the ethylenically unsaturated carboxylate portion of the salt is or are polyvalent (i.e., has a valency greater than one), the salt may additionally comprise a carboxylate portion that is not ethylenically unsaturated (i.e., does not contain any carbon-carbon double bonds) and/or an ethylenically unsaturated carboxylate portion containing fewer than six carbon atoms (e.g., an acrylate or methacrylate portion). For example, where the salt is a salt of a divalent species such as zinc or calcium, the salt may correspond to the formula MXY, wherein M=Zn or Ca, X=a carboxylate derived from an ethylenically unsaturated carboxylic acid containing six or more carbon atoms and Y=a carboxylate derived from acrylic acid or methacrylic acid.

Furthermore, in embodiments where the cationic portion of the salt is polyvalent, the carboxylate portion may be comprised of a plurality of ethylenically unsaturated carboxylate moieties containing six or more carbon atoms which are the same as or different from each other.

It is also possible to employ ethylenically unsaturated carboxylic acids containing two or more carboxylic acid functional groups per molecule, thereby providing two or more —C(=O)O$^-$ groups which are each ionically bonded with a single polyvalent cation (such as Zn$^{+2}$ or Ca$^{+2}$).

The cation or cations which is or are the counterion(s) in the salt may be provided by any suitable element and may be monovalent (i.e., a valency of one) or polyvalent (i.e., a valency of two, three, four, five, six or more). In one advantageous embodiment, such element is divalent. Suitable elements for use as the cation(s) include both metallic and non-metallic elements and may, for example, be selected from the group consisting of Li, Na, K, Ce, Mg, Ca, Sr, Ba, Ti, Zr, V, Cr, Mo, W, Mn, Fe, Co, Ni, Pd, Cu, Zn, Cd, Hg, B, Al, Ga, In, Si, Ge, Sn, Pb, Sb and Bi. Zinc and calcium are used in particular embodiments of the invention.

In certain embodiments, the curable compositions of the present invention are characterized by the inclusion of one or more (meth)acrylate salts corresponding to Formula (I):

M(OC(=O)CR$^1$=CH$_2$)$_x$(O—C(=O)—R$^2$—C(=O)—O—R$^3$—O—C(=O)CR$^4$=CH$_2$)$_y$      (I)

wherein M is an element other than hydrogen (H) of valence n, n=x+y, y=an integer of at least 1, $R^1$ and $R^4$ are the same or different and are H or $CH_3$ and $R^2$ and $R^3$ are the same or different and are divalent organic moieties each containing two or more carbon atoms.

In various embodiments of the invention, $R^2$ may be a cyclohexyl moiety, which may be unsubstituted or substituted with one or more substituents such as an alkyl group (e.g., a $C_1$-$C_6$ alkyl group, e.g., methyl). In one embodiment, $R^2$ is a 1,2-cyclohexyl moiety, which may have one or more substituents, such as alkyl groups, on the cyclohexane ring. In other embodiments, $R^2$ may be an alkylene moiety, which may be substituted or unsubstituted and which may correspond to the general formula —$(CH_2)_m$—, wherein m is an integer of 2 or more (e.g., 2-20). In still other embodiments, $R^2$ may be a phenylene moiety, in particular an ortho-phenylene moiety, which may be unsubstituted or substituted with one or more substituents such as an alkyl group (e.g., a $C_1$-$C_6$ alkyl group, e.g., methyl).

In other embodiments, $R^3$ is a branched or linear alkylene moiety, such as, but not limited to, —$CH_2CH_2$—, —$CH(CH_3)CH_2$— or an oligo-oxyalkylene moiety such as, but limited to, —$(CH_2CH_2O)_oCH_2CH_2$— wherein o is an integer of 1 or more (e.g., 1-10). In still other embodiments, $R^3$ may be a substituted alkylene moiety corresponding, for example, to the formula —$CH(R^5)CH_2$—, where $R^5$ may be an aryl group (e.g., phenyl or substituted phenyl), aralkyl group (e.g., benzyl), alkyl group (e.g., $C_1$-$C_{20}$ alkyl), or ether-containing hydrocarbyl group (e.g., Ar—O—$CH_2$— or Alk-O—$CH_2$—, where Ar is a substituted or unsubstituted aromatic group such as phenyl and Alk is an alkyl group).

Methods of Making Salts of Ethylenically Unsaturated Carboxylic Acids

Salts of ethylenically unsaturated carboxylic acids useful in the present invention are known in the art and are described, for example, in U.S. Pat. Nos. 3,899,382; 6,399,672 and U.S. Pat. Pub. No. 2007/0054969. The disclosure of each of these patent documents is incorporated herein by reference in its entirety for all purposes. Such (meth)acrylate salts are also available from commercial sources, in particular from Sartomer Americas of Arkema Inc. in Exton, Pa. ("Sartomer").

Suitable methods for making such salts comprise reacting a hydroxy-functionalized compound with a carboxylic polyacid or anhydride to form a carboxylic acid-functionalized compound and then reacting that carboxylic acid-functionalized compound with a compound which serves as a source of the cationic portion of the salt. During the latter reaction, the carboxylic acid-functionalized compound is converted to the salt form.

The hydroxy-functionalized compounds used in such preparations can be saturated or unsaturated compounds (i.e., such hydroxy-functionalized compounds may or may not contain one or more carbon-carbon double bonds). Saturated hydroxy-functionalized compounds can be used when the carboxylic polyacid and/or anhydride compound contains ethylenic unsaturation. Unsaturated hydroxy-functionalized compounds can be used when the carboxylic polyacid and/or anhydride compound does not contain ethylenic unsaturation. In other embodiments, both the hydroxy-functionalized compound and the carboxylic polyacid or anhydride compound contain one or more sites of ethylenic unsaturation (one or more carbon-carbon double bonds).

For the hydroxy-functionalized compounds containing an ethylenically unsaturated group, the unsaturation can be provided, for example, by (meth)acryloyl, maleyl, allyl, propenyl and/or vinyl groups. As used herein, the term "(meth)acryloyl" is intended to both include methacryloyl and acryloyl.

Some examples of such suitable hydroxy-functionalized compounds which contain one or more (meth)acrylate functional groups include hydroxyalkyl (meth)acrylates (e.g., hydroxyethyl (meth)acrylate, hydroxypropyl (meth)acrylate, hydroxybutyl (meth)acrylate); alkyl glycidyl (meth) acrylates, aryl glycidyl (meth)acrylates and allyl glycidyl (meth)acrylates that have been ring-opened with hydroxyalkyl (meth)acrylates such as hydroxyethyl (meth)acrylate or hydroxypropyl (meth)acrylate; trimethylolpropane mono- and di-(meth)acrylates; pentaerythritol mono-, di- and tri-(meth)acrylates; dipentaerythritol mono-, di-, tri-, tetra- and penta-(meth)acrylates; glycerol mono- and di-(meth)acrylates; neopentyl glycol mono(meth)acrylate; alkylenediol mono(meth)acrylates such as hexanediol mono(meth)acrylate; tris(2-hydroxyethyl)isocyanurate mono- and di-(meth) acrylates; alkoxylated (e.g., ethoxylated or propoxylated) versions of all of the above; polyethylene glycol mono (meth)acrylates; polypropylene glycol mono(meth)acrylates; polyethylene/propylene glycol mono(meth)acrylates; polybutylene glycol mono(meth)acrylates; polytetramethylene glycol mono(meth)acrylates; hydroxy polycaprolactone mono(meth)acrylates and the like and combinations thereof. Residues of these compounds may be represented by $R^3$ in Formulas (I) and (II).

Examples of hydroxy-functionalized compounds which contain one or more allyl groups include allyl alcohol, propoxylated and/or ethoxylated allyl alcohols, cinnamyl alcohol, crotyl alcohol, 3-butene-1-ol, 3-butene-2-ol, linalool, 2-cyclohexen-1-ol, 2-cyclopenten-1-ol, 2-butene-1,4-diol, glycerol mono- and di-allyl ethers, trimethylolpropane mono- and di-allyl ethers and the like.

Other hydroxy-functionalized compounds containing one or more vinyl groups such as, for example, ethylene glycol vinyl ether, propylene glycol vinyl ether, 1,4-butanediol vinyl ether, 1,3-butanediol vinyl ether, 1,6-hexanediol vinyl ether, 2-methyl-1,3-propane diol vinyl ether, di(ethylene glycol) vinyl ether, di(propylene glycol) vinyl ether and the like can also be used.

Carboxylic polyacids or anhydrides which can be reacted with hydroxy-functionalized compounds have either two or more carboxylic acid groups per molecule or at least one anhydride group per molecule or at least one anhydride group and at least one carboxylic group per molecule. The hydroxy-functionalized compound reacts with the carboxylic polyacid or anhydride to form a carboxylic acid-functionalized compound (which in some cases may be considered a "half-ester") which is suitable for reaction with a compound capable of providing the cationic portion of the salt (e.g., a metal compound, such as a metal oxide, for example zinc oxide). The carboxy equivalent functionality of suitable carboxylic polyacids and anhydrides may be about 2-30, preferably, 2-6.

Suitable compounds containing anhydride and/or carboxylic acid groups which react with the hydroxy-functionalized compounds include aromatic and aliphatic compounds such as phthalic anhydride, isophthalic acid, terephthalic acid, tetrabromophthalic anhydride, tetrahydrophthalic anhydride, hexahydrophthalic anhydride (1,2-cyclohexanedicarboxylic anhydride) and alkyl-substituted analogues thereof, itaconic anhydride, itaconic acid, phthalic acid, trimellitic anhydride (which contains one anhydride and one carboxyl group), pyromellitic dianhydride, 5-norbornene-endo-2,3-dicarboxylic anhydride, naphthyl anhydride, naphthalene tetracarboxylic acid dianhydride, maleic anhydride, citraconic anhydride, diphenic anhydride, succinic anhydride, chlorendic anhydride, maleic acid, succinic acid, fumaric acid, oxalic acid, malonic acid, glutaric acid, glutaric anhydride, adipic acid, dimer fatty acids, hexahydrotrimellitic anhydride, biphenyl tetracarboxylic acid dianhydrides, diphthalic anhydrides, homophthalic anhydride, aconitic anhydride, benzophenone tetracarboxylic acid dianhydrides, styrene/maleic anhydride oligomers and polymers and (meth)acrylic acid oligomers, polymers and co-polymers.

Suitable compounds capable of providing the cationic portion of the salt when reacted with the hydroxy-functionalized compound/carboxylic polyacid and/or anhydride reaction products (e.g., half esters) prepared as described above include both metallic and non-metallic compounds. Suitable compounds for this purpose include compounds containing one or more elements selected from lithium, sodium, potassium, cesium, magnesium, calcium, strontium, barium, titanium, zirconium, vanadium, chromium, molybdenum, tungsten, manganese, iron, cobalt, nickel, palladium, copper, zinc, cadmium, mercury, boron, aluminum, gallium, indium, silicon, germanium, tin, lead, antimony, bismuth and the like. The compounds can be, for example, oxides, halides, alkoxides, hydroxides, nitrates, sulfates, carboxylates and carbonates of the aforementioned elements. The most preferred compound for reaction with the hydroxy-functionalized compound/polycarboxylic acid and/or anhydride reaction products is zinc oxide, since it reacts very easily and is readily available.

One suitable method of making salts of ethylenically unsaturated carboxylic acids suitable for use in the present invention involves reacting an M-containing compound with a carboxylic acid corresponding to Formula (II), which may be considered a "half-ester":

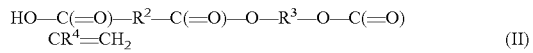

HO—C(=O)—R$^2$—C(=O)—O—R$^3$—O—C(=O)CR$^4$=CH$_2$     (II)

The M-containing compound serves as the source of M in the (meth)acrylate salt of Formula (I). That is, suitable M-containing compounds include those compounds capable of reacting with the carboxylic acid of Formula (II) and which can provide one or more M ions when reacted with a carboxylic acid of Formula (II). Suitable M-containing compounds may, in various embodiments of the invention, be selected from the group consisting of M-containing oxides, M-containing halides, M-containing alkoxides, M-containing hydroxides, M-containing nitrates, M-containing sulfates, M-containing carboxylates, M-containing carbonates and combinations thereof. For example, the M-containing compound may correspond to the formula M(X)$_n$, wherein each X is independently oxygen, halide, alkoxide, hydroxide, nitrate, sulfate, carboxylate, carbonate or combinations thereof if more than one X is present, and n=the valency of M. M-containing oxides in particular may be used, especially zinc oxide or calcium oxide.

As previously mentioned, ethylenically unsaturated functional groups suitable for use in the present invention include groups containing at least one carbon-carbon double bond, in particular a carbon-carbon double bond capable of participating in a reaction (e.g., a free radical reaction) wherein at least one carbon of the carbon-carbon double bond becomes covalently bonded to an atom, in particular a carbon atom, in a second molecule. Such reactions may result in a polymerization or curing whereby the compound(s) containing one or more ethylenically unsaturated functional groups become(s) part of a polymerized matrix or polymeric chain. The carbon-carbon double bond may, for example, be present as part of an α,β-unsaturated carbonyl moiety, e.g., an α,β-unsaturated ester moiety such as an acrylate functional group (H$_2$C=CH—C(=O)O—) or a methacrylate functional group (H$_2$C=C(CH$_3$)—C(=O)O—). A carbon-carbon double bond may also be present in the ethylenically unsaturated functional group in the form of a vinyl group —CH=CH$_2$ or an allyl group, —CH$_2$—CH=CH$_2$.

Multifunctional (Meth)acrylate Oligomers

The curable compositions of the present invention are also characterized by the presence of one or more multifunctional (meth)acrylate oligomers. Such oligomers are typically of moderate molecular weight and contain two or more (meth)acrylate functional groups per molecule (i.e., in this content the term "multifunctional") refers to the presence of a plurality of (meth)acrylate functional groups in the oligomer molecule). This type of oligomer may also be referred to as multi(meth)acrylate-functionalized oligomers due to the presence of multiple (meth)acrylate functional groups. Such (meth)acrylate functional groups (e.g., methacrylate functional groups corresponding to the structure —O—C(=O)C(CH$_3$)=CH$_2$) and acrylate functional groups corresponding to the structure —O—C(=O)CH=CH$_2$) are capable of reacting with other ethylenically unsaturated groups present in the curable composition when the curable composition is cured, for example through a free radical or cationic polymerization. Mixtures of different multifunctional (meth)acrylate oligomers may be used. The number average molecular weight of the multifunctional (meth)acrylate oligomer(s) may be, in various embodiments of the invention, at least 500 daltons, at least 750 daltons, at least 1000 daltons, at least 1500 daltons or at least 2000 daltons and not more than 10,000 daltons, not more than 9000 daltons or not more than 8000 daltons. In one embodiment, the curable composition comprises a di(meth)acrylate-functionalized oligomer or mixture of di(meth)acrylate-functionalized oligomers. In other embodiments, the curable composition does not contain any multifunctional (meth)acrylate oligomer other than di(meth)acrylate-functionalized oligomer. In certain embodiments, the curable composition may additionally comprise one or more mono(meth)acrylate-functionalized oligomers (i.e., oligomers containing a single (meth)acrylate functional group per molecule).

Suitable free radical-curable multifunctional (meth)acrylate oligomers include, for example, polyester (meth)acrylates, epoxy (meth)acrylates, polyether (meth)acrylates, polyurethane (meth)acrylates, acrylic (meth)acrylate oligomers, epoxy-functional (meth)acrylate oligomers and combinations thereof, each of which contains at least two (meth)acrylate functional groups per molecule (which may be positioned at a terminus of the molecule and/or along the backbone of the molecule).

Each type of multifunctional (meth)acrylate oligomer may provide specific properties to the composition when cured and thus can be selected and varied as may be needed to achieve certain desired physical properties in the cured composition. Such oligomers generally impart toughness to the photo-cured composition as compared to (meth)acrylate-functionalized monomers and also can be employed to tailor hardness, flexibility, adhesion and/or chemical resistance. In the present invention, multifunctional (meth)acrylate oligomers, especially those of higher molecular weight (e.g., oligomers having number average molecular weights of from 2000 g/mol to 10,000 g/mol or even higher) have been found to be useful for providing the composition, when cured, with flexibility (high elongation at break) and impact resistance.

Exemplary polyester (meth)acrylates include the reaction products of acrylic or methacrylic acid or mixtures thereof with hydroxyl group-terminated polyester polyols. The reaction process may be conducted such that a significant concentration of residual hydroxyl groups remain in the polyester (meth)acrylate or may be conducted such that all or essentially all of the hydroxyl groups of the polyester polyol have been (meth)acrylated. The polyester polyols can be made by polycondensation reactions of polyhydroxyl functional components (in particular, diols) and polycarboxylic acid functional compounds (in particular, dicarboxylic acids and anhydrides). The polyhydroxyl functional and polycarboxylic acid functional components can each have linear, branched, cycloaliphatic or aromatic structures and can be used individually or as mixtures.

Examples of suitable epoxy (meth)acrylates include the reaction products of acrylic or methacrylic acid or mixtures thereof with glycidyl ethers (such as bisphenol diglycidyl ethers and oligomeric epoxy resins) or esters. Epoxy (meth)acrylate oligomers are available from commercial sources such as Sartomer, including Sartomer's CN159 product.

Suitable polyether (meth)acrylates include, but are not limited to, the condensation reaction products of acrylic or methacrylic acid or mixtures thereof with polyetherols which are polyether polyols. Suitable polyetherols can be linear or branched substances containing ether bonds and terminal hydroxyl groups. Polyetherols can be prepared by ring opening polymerization of cyclic ethers such as tetrahydrofuran or alkylene oxides with a starter molecule. Suitable starter molecules include water, hydroxyl functional materials (e.g., polyols, bisphenols and the like), polyester polyols and amines.

Polyurethane (meth)acrylates (sometimes also referred to as "urethane (meth)acrylates" or "(meth)acrylate-functionalizeed urethane oligomers") capable of being used in the curable compositions of the present invention include urethanes based on aliphatic and/or aromatic polyester polyols and polyether polyols and aliphatic and/or aromatic polyester diisocyanates and polyether diisocyanates capped with (meth)acrylate end-groups. Suitable polyurethane (meth)acrylates include, for example, aliphatic polyester-based urethane diacrylate oligomers, aliphatic polyether-based urethane diacrylate oligomers, as well as aliphatic polyester/polyether-based urethane diacrylate oligomers.

In various embodiments, the polyurethane (meth)acrylates may be prepared by reacting aliphatic and/or aromatic diisocyanates with OH group terminated polyester polyols (including aromatic, aliphatic and mixed aliphatic/aromatic polyester polyols), polyether polyols, polycarbonate polyols, polycaprolactone polyols, polydimethysiloxane polyols or polybutadiene polyols or combinations thereof to form isocyanate-functionalized oligomers which are then reacted with hydroxy-functionalized (meth)acrylates such as hydroxyethyl acrylate or hydroxyethyl methacrylate to provide terminal (meth)acrylate groups. For example, the polyurethane (meth)acrylates may contain two, three, four or more (meth)acrylate functional groups per molecule.

One or more urethane diacrylates are employed in certain embodiments of the invention. For example, the curable composition may comprise (in addition to the inventive mono functional compound) at least one urethane diacrylate comprising a difunctional aromatic urethane acrylate oligomer, a difunctional aliphatic urethane acrylate oligomer and combinations thereof. In certain embodiments, a difunctional aromatic urethane acrylate oligomer, such as that available from Sartomer under the trade name CN9782, may be used as the at least one urethane diacrylate. In other embodiments, a difunctional aliphatic urethane acrylate oligomer, such as that available from Sartomer under the trade name CN9023, may be used as the at least one urethane diacrylate. CN9782, CN9023, CN978, CN965, CN966, CN9031, CN8881 and CN8886, all available from Sartomer, may all be advantageously employed as urethane diacrylates in the curable compositions of the present invention.

Suitable acrylic (meth)acrylate oligomers (sometimes also referred to in the art as "acrylic oligomers") include oligomers which may be described as substances having an oligomeric acrylic backbone which is functionalized with two or more (meth)acrylate groups (which may be at a terminus of the oligomer or pendant to the acrylic backbone). The acrylic backbone may be a homopolymer, random copolymer or block copolymer comprised of repeating units of acrylic monomers. The acrylic monomers may be any monomeric (meth)acrylate such as $C_1$-$C_6$ alkyl (meth)acrylates as well as functionalized (meth)acrylates such as (meth)acrylates bearing hydroxyl, carboxylic acid and/or epoxy groups. Acrylic (meth)acrylate oligomers may be prepared using any procedures known in the art such as oligomerizing monomers, at least a portion of which are functionalized with hydroxyl, carboxylic acid and/or epoxy groups (e.g., hydroxyalkyl(meth)acrylates, (meth)acrylic acid, glycidyl (meth)acrylate) to obtain a functionalized oligomer intermediate, which is then reacted with one or more (meth)acrylate-containing reactants to introduce the desired (meth)acrylate functional groups. Suitable acrylic (meth)acrylate oligomers are commercially available from Sartomer under products designated as CN820, CN821, CN822 and CN823, for example.

Mono(meth)acrylate Esters of Alcohols

The curable compositions of the present invention are further characterized by the inclusion of at least one mono (meth)acrylate ester of an alcohol which, when polymerized as a homopolymer, has a glass transition temperature of at least 50° C. Such mono(meth)acrylate esters may herein sometimes be referred to as "high Tg (meth)acrylates".

Suitable high Tg (meth)acrylates are compounds containing an acryloyl or methacryloyl functional group capable of reacting with other components of the curable composition to form a thermoset matrix. In addition to the (meth)acryloyl functional group, the high Tg (meth)acrylate has one or more structural features or moieties (such as cyclic structural moieties and/or hydroxyl groups) which contribute to the ability of the (meth)acrylate to form a polymer having a high glass transition temperature when homopolymerized. In various embodiments of the invention, the high Tg (meth)acrylate, when polymerized as a homopolymer, has a glass transition temperature of at least 55° C., at least 60° C., at least 65° C., at least 70° C., at least 75° C., at least 80° C., at least 85° C., at least 90° C., at least 95° C. or at least 100° C. The Tg of such homopolymer may be, for example, as high as 200° C., as high as 175° C. or as high as 150° C.

The glass transition temperature of a homopolymer of a (meth)acrylate monomer may be determined by photocuring the (meth)acrylate monomer to maximum conversion in the presence of a photoinitiator and then measuring the Tg of the resulting homopolymer via Dynamic Mechanical Analysis (DMA) following the procedures described in ASTM E1640-13.

In certain embodiments, the high Tg (meth)acrylate corresponds to Formula (III):

$$Z-O-C(=O)C(R^6)=CH_2 \quad (III)$$

wherein Z is a hydroxyalkyl group (e.g., $HOCH_2CH_2-$, $HOC(CH_3)CH_2-$) or a monovalent moiety which contains at least one cyclic structural element and $R^6$ is H or $CH_3$. The cyclic structural element(s) contained in moiety Z may be any cyclic structure including (formed by) atoms selected from the group consisting of carbon, oxygen, nitrogen and sulfur atoms. In certain embodiments, moiety Z does not contain any free radical-polymerizable functional groups. In particular aspects of the invention, the cyclic structural element(s) is or are selected from the group consisting of aliphatic hydrocarbon rings (in particular, saturated aliphatic hydrocarbon rings), aromatic hydrocarbon rings, heterocyclic rings and combinations thereof. Moiety Z may, in one embodiment, contain both at least one hydroxyl group and at least one cyclic structural element; accordingly, Z may be, for example, a hydroxy-substituted alicyclic or aromatic group.

Suitable aliphatic hydrocarbon rings include monocyclic aliphatic hydrocarbon rings and polycyclic aliphatic hydrocarbon rings, especially saturated monocyclic aliphatic hydrocarbon rings and saturated polycyclic aliphatic hydrocarbon rings. Monocyclic aliphatic hydrocarbon rings include, but are not limited to, cycloalkane rings such as a cyclopropane ring, a cyclobutane ring, a cyclopentane ring, a cyclohexane ring, a cycloheptane ring or a cyclooctane ring or $C_3$-$C_{10}$ cycloalkane rings generally.

Suitable polycyclic aliphatic hydrocarbon rings include, but are not limited to, bridged rings such as a norbornane ring, a bicyclo[2.2.1]heptane ring, a bicyclo[3.2.1]octane ring, a bicyclo[4.3.2]undecane ring, an adamantane ring, a tricyclodecane ring or a tetracyclododecane ring, as well as spiro rings. Suitable aromatic hydrocarbon rings include, but are not limited to, monocyclic aromatic hydrocarbon rings, such as a benzene ring and polycyclic aromatic hydrocarbon rings typified by fused benzene rings such as a naphthalene ring, an anthracene ring, a phenanthrene ring, a fluorene ring, an indene ring or a pyrene ring.

Suitable heterocyclic rings include, but are not limited to, heterocyclic rings including carbon atom(s) and oxygen atom(s); heterocyclic rings including carbon atom(s) and nitrogen atom(s) and heterocyclic rings including carbon atom(s) and sulfur atom(s). More specifically, suitable heterocyclic rings include non-aromatic heterocyclic rings such as an oxirane ring, a tetrahydrofuran ring, a tetrahydropyran ring, a morpholine ring, a chroman ring, an isochroman ring, a tetrahydrothiophene ring, a tetrahydrothiopyran ring, an aziridine ring, a pyrrolidine ring, a piperidine ring, a piperazine ring, an indo line ring, a 2,6-dioxabicyclo[3.3.0]octane ring or a 1,3,5-triazacyclohexane ring and aromatic heterocyclic rings such as a thiophene ring, a pyrrole ring, a furan ring or a pyridine ring.

The cyclic structural element, including any of the cyclic structural elements above-mentioned, may be or substituted by one or more substituents other than hydrogen, such as an alkyl group, an aryl group, an alkaryl group, an alkoxy group, a halide or the like, provided that such substituent(s) do not interfere with the ability of the high Tg (meth)acrylate to be used for its intended purpose in the curable composition of the present invention. In embodiments of the invention, the cyclic structural element(s) is or are selected from the group consisting of saturated bicyclic and tricyclic hydrocarbon radicals. The cyclic structural element(s) may, for example, be selected from the group consisting of a tricyclo[5.2.1.0$^{2,6}$]decane radical, a tricyclo[3.3.1.1$^{3,7}$]decane radical and a bicyclo[2.2.1]heptane radical.

Suitable exemplary high Tg (meth)acrylates containing cyclic structural elements include, but are not limited to, isobornyl (meth)acrylate, phenyl (meth)acrylate, 3,3,5-trimethyl cyclohexyl (meth)acrylate, tert-butyl cyclohexyl (meth)acrylate, cyclohexane (meth)acrylate, cyclohexane methanol (meth)acrylate, cyclohexane dimethanol mono (meth)acrylate, benzyl (meth)acrylate, tricyclodecanedimethanol mono(meth)acrylates, tricyclodecanemethanol (meth)acrylates, monohydroxy-naphthalene (meth)acrylates, monohydroxy-anthracene (meth)acrylates, monohydroxy-biphenyl (meth)acrylates and the like and combinations thereof.

Amounts of Ethylenically Unsaturated Carboxylic Acid Salt(s), Multifunctional (meth)acrylate Oligomer(s) and High Tg (Meth)acrylate Ester(s)

Generally speaking, the relative amounts and proportions of the above-discussed components of curable compositions in accordance with the present invention are not believed to be particularly critical and may be adjusted or varied as may be needed to order to obtain certain desired properties and attributes in the curable composition, in both its uncured and cured state. For example, the curable composition may comprise, consist essentially of or consist of, in various embodiments of the invention, 1 to 25% by weight ethylenically unsaturated carboxylic salt or salts, 20 to 55% by weight multifunctional (meth)acrylate oligomer or oligomers and 25 to 60% by weight high Tg (meth)acrylate ester or esters, based on the total weight of these three components.

Other Optional Components of the Curable Composition

The curable composition may contain one or more reactive components in addition to the ethylenically unsaturated carboxylic acid salts, multifunctional (meth)acrylate oligomers and high Tg (meth)acrylate esters discussed herein. Such additional components are capable of reacting when the curable composition is cured, thereby becoming part of the polymeric matrix which is formed upon curing. Such reactive components will typically contain one or more sites of ethylenic unsaturation per molecule, such as those provided by (meth)acryloyl, allyl, vinyl, maleyl, propenyl or other such groups. In various embodiments, however, the total amount of such additional reactive components is not more than 20%, not more than 15%, not more than 10% or not more than 5% by weight of the total weight of ethylenically unsaturated carboxylic acid salt, multifunctional (meth)acrylate oligomer and high Tg (meth)acrylate ester.

Examples of suitable additional reactive components include mono(meth)acrylate esters which, when polymerized as homopolymers, have glass transition temperatures less than 50° C. as well as di-, tri- and higher functionality (meth)acrylate monomers.

Advantageously, the curable compositions may be formulated to be solvent-free, i.e., free of any non-reactive volatile substances.

However, in certain other embodiments of the invention, the curable composition may contain one or more solvents, in particular one or more organic solvents, which may be non-reactive organic solvents. In various embodiments, the solvent(s) may be relatively volatile, e.g., solvents having a boiling point at atmospheric pressure of not more than 150° C. In other embodiments, the solvent(s) may have a boiling point at atmospheric pressure of at least 40° C.

The solvent(s) may be selected so as to be capable of solubilizing one or more components of the curable composition and/or adjusting the viscosity or other rheological properties of the curable composition.

However, the curable compositions of the present invention may alternatively be formulated so as to contain little or no non-reactive solvent, e.g., less than 10% or less than 5% or even 0% non-reactive solvent, based on the total weight of the curable composition. Such solvent-less or low-solvent compositions may be formulated using various components, including for example low viscosity reactive diluents and/or water, which are selected so as to render the curable composition sufficiently low in viscosity, even without solvent being present, that the curable composition can be easily applied at a suitable application temperature to a substrate surface so as to form a relatively thin, uniform layer.

Suitable solvents may include, for example, organic solvents such as: ketones (both acyclic ketones and cyclic ketones) such as acetone, methyl ethyl ketone, iso-butyl ethyl ketone and cyclopentanone; esters such as ethyl acetate, butyl acetate, ethylene glycol methyl ether acetate, ethylene glycol monoethyl ether acetate, ethylene glycol monobutyl ether acetate and propylene glycol methyl ether acetate; carbonates such as dimethyl carbonate, propylene glycol carbonate and ethylene glycol carbonate; alcohols such as ethoxyethanol, methoxyethanol, 1-methoxy-2-propanol, methyl alcohol, ethyl alcohol, n-propyl alcohol, butyl alcohol, isopropyl alcohol and diacetone alcohol; aromatic solvents such as xylene, benzene, toluene and ethylbenzene; alkanes such as hexanes and heptane; glycol ethers such as ethylene glycol monobutyl ether (butyl cellosolve), ethylene glycol monomethyl ether (2-methoxyethanol), ethylene glycol monoethyl ether (2-ethoxyethanol), ethylene glycol monopropyl ether (2-propoxyethanol), ethylene glycol monoisopropyl ether (2-isopropoxyethanol), ethylene glycol monophenyl ether (2-phenoxyethanol), ethylene glycol monobenzyl ether (2-benzyloxyethanol), diethylene glycol monomethyl ether (methyl carbitol), diethylene glycol monoethyl ether (carbitol cellosolve), diethylene glycol mono-n-butyl ether (2-(2-butoxyethoxy)ethanol), ethylene glycol dimethyl ether, ethylene glycol diethyl ether and ethylene glycol dibutyl ether; ethers such as tetrahydrofuran, dimethyl ether, diethyl ether; as well as amides such as NMP and DMF; as well as combinations thereof.

In various embodiments, the curable composition is comprised of at least one solvent selected from the group consisting of ketones, esters, carbonates, alcohols, alkanes, aromatics, ethers, amides and glycol ethers and combinations thereof. According to certain aspects of the invention, the at least one solvent is included in an amount sufficient to render the curable compositions described herein sufficiently flowable for application to a substrate.

In various embodiments of the invention, the curable compositions described herein have a viscosity of less than 5000 cPs or less than 4000 cPs or less than 3000 cPs or less than 2500 cPs, as measured at 25° C. using a Brookfield viscometer, model DV-II, using a 27 spindle (with the spindle speed varying typically between 20 and 200 rpm, depending on viscosity).

In particular embodiments, the at least one solvent is removed from the curable compositions described herein before curing by exposure to an energy source (radiation, heating) is initiated. For example, solvent may be removed by evaporation prior to energy-induced curing. If so desired, a substrate having one or more layers of the curable composition applied to a surface thereof may be heated and/or subjected to a flow of gas and/or placed under vacuum so as to facilitate solvent evaporation.

In certain embodiments of the invention, the curable composition is formulated to contain water, rather than non-reactive solvent. Such compositions may be referred to as water-borne systems, wherein one or more or all of the components of the curable composition are present as dispersions in water. Emulsifiers and/or dispersing agents may be employed to create and maintain stable aqueous dispersions of the curable composition components. One or more of the curable composition components may, in certain embodiments, be self-dispersing. Such a water-borne composition may be applied to the surface of a substrate, with the water serving to reduce the viscosity of the curable composition. The applied layer of the curable composition may then be treated to remove the water (by evaporation, for example), wherein the coating is thereafter cured (e.g., by heating and/or exposure to radiant energy). Curing of the polymerizable components of the curable composition (for example, by irradiation of the coating by an appropriate energy source) may be conducted after evaporation of the water.

In certain embodiments of the invention, the curable compositions described herein include at least one photoinitiator and are curable with radiant energy. For example, the photoinitiator(s) may be selected from the group consisting of α-hydroxyketones, phenylglyoxylates, benzyldimethylketals, α-aminoketones, mono-acyl phosphines, bis-acyl phosphines, phosphine oxides and combinations thereof. In particular embodiments, the at least one photoinitiator may be 1-hydroxy-cyclohexyl-phenyl-ketone and/or 2-hydroxy-2-methyl-1-phenyl-1-propanone. In other embodiments, the at least one photoinitiator is or includes a phosphine oxide, in particular bis(2,4-6-trimethylbenzoyl)phenyl phosphine oxide.

Suitable photoinitiators include, but are not limited to, 2-methylanthraquinone, 2-ethylanthraquinone, 2-chloroanthraquinone, 2-benzyanthraquinone, 2-t-butylanthraquinone, 1,2-benzo-9,10-anthraquinone, benzyl, benzoin, benzoin methyl ether, benzoin ethyl ether, benzoin isopropyl ether, alpha-methylbenzoin, alpha-phenylbenzoin, Michler's ketone, benzophenone, 4,4'-bis-(diethylamino)benzophenone, acetophenone, 2,2-diethyloxyacetophenone, diethyloxyacetophenone, 2-isopropylthioxanthone, thioxanthone, diethyl thioxanthone, 1,5-acetonaphthylene, ethyl-p-dimethylaminobenzoate, benzil ketone, α-hydroxy keto, 2,4,6-trimethylbenzoyldiphenyl phosphine oxide, benzyl dimethyl ketal, benzil ketal (2,2-dimethoxy-1,2-diphenylethanone), 1-hydroxycylclohexyl phenyl ketone, 2-methyl-1-[4-(methylthio) phenyl]-2-morpholinopropanone-1,2-hydroxy-2-methyl-1-phenyl-propanone, oligomeric α-hydroxy ketone, phenylbis(2,4,6-trimethylbenzoyl)phosphine oxide, ethyl-4-dimethylamino benzoate, ethyl(2,4,6-trimethylbenzoyl)phenyl phosphinate, anisoin, anthraquinone, anthraquinone-2-sulfonic acid, sodium salt monohydrate, (benzene)tricarbonylchromium, benzil, benzoin isobutyl ether, benzophenone/1-hydroxycyclohexyl phenyl ketone, 50/50 blend, 3,3',4,4'-benzophenonetetracarboxylic dianhydride, 4-benzoylbiphenyl, 2-benzyl-2-(dimethylamino)-4'-morpholinobutyrophenone, 4,4'-bis(diethylamino)benzophenone, 4,4'-bis(dimethylamino)benzophenone, camphorquinone, 2-chlorothioxanthen-9-one, dibenzosuberenone, 4,4'-dihydroxybenzophenone, 2,2-dimethoxy-2-phenylacetophenone, 4-(dimethylamino)benzophenone, 4,4'-dimethylbenzil, 2,5-dimethylbenzophenone, 3,4-dimethylbenzophenone, diphenyl(2,4,6-trimethylbenzoyl)phosphine oxide/2-hydroxy-2-methylpropiophenone, 50/50 blend, 4'-ethoxyacetophenone, 2,4,6-trimethylbenzoyldiphenylphophine oxide, phenyl bis(2,4,6-trimethyl benzoyl)phosphine oxide, ferrocene, 3'-hydroxyacetophenone, 4'-hydroxyacetophenone, 3-hydroxybenzophenone, 4-hydroxybenzophenone, 1-hydroxycyclohexyl phenyl ketone, 2-hydroxy- 2-methylpropiophenone, 2-methylbenzophenone, 3-methylbenzophenone, methylbenzoylformate, 2-methyl-4'-(methylthio)-2-morpholinopropiophenone, phenanthrenequinone, 4'-phenoxyacetophenone, (cumene)cyclopentadienyl iron (ii) hexafluorophosphate, 9,10-diethoxy and 9,10-dibutoxy-anthracene, 2-ethyl-9,10-dimethoxyanthracene, thioxanthen-9-one and combinations thereof.

The amount of photoinitiator is not considered to be critical, but may be varied as may be appropriate depending upon the photoinitiator(s) selected, the amounts and types of ethylenically unsaturated compounds present in the curable composition, the radiation source and the radiation conditions used, among other factors. Typically, however, the amount of photoinitiator may be from 0.05% to 5% by weight, based on the total weight of the curable composition (not including any water or non-reactive solvent that may be present).

In certain embodiments of the invention, the curable compositions described herein do not include any initiator and are curable with electron beam energy. In other embodiments, the curable compositions described herein include at least one free radical initiator that decomposes when heated or in the presence of an accelerator and are curable chemically (i.e., without having to expose the curable composition to radiation). The at least one free radical initiator that decomposes when heated or in the presence of an accelerator may, for example, comprise a peroxide or azo compound. Suitable peroxides for this purpose may include any compound, in particular any organic compound, that contains at least one peroxy (—O—O—) moiety, such as, for example, dialkyl, diaryl and aryl/alkyl peroxides, hydroperoxides, percarbonates, peresters, peracids, acyl peroxides and the like. The at least one accelerator may comprise, for example, at least one tertiary amine and/or one or more other reducing agents based on M-containing salts (such as, for example, carboxylate salts of transition M-containing such as iron, cobalt, manganese, vanadium and the like and combinations thereof). The accelerator(s) may be selected so as to promote the decomposition of the free radical initiator at room or ambient temperature to generate active free radical species, such that curing of the curable composition is achieved without having to heat or bake the curable composition. In other embodiments, no accelerator is present and the curable composition is heated to a temperature effective to cause decomposition of the free radical initiator and to generate free radical species which initiate curing of the polymerizable compound(s) present in the curable composition.

Thus, in various embodiments of the present invention, the curable compositions described herein are curable by techniques selected from the group consisting of radiation curing (UV radiation or electron beam curing), electron beam curing, chemical curing (using a free radical initiator that decomposes when heated or in the presence of an accelerator, e.g., peroxide curing), heat curing or combinations thereof.

The curable compositions of the present invention may optionally contain one or more additives instead of or in addition to the above-mentioned ingredients. Such additives include, but are not limited to, antioxidants, ultraviolet absorbers, photostabilizers, foam inhibitors, flow or leveling agents, colorants, pigments, dispersants (wetting agents), slip additives, fillers, thixotropic agents, matting agents, thermoplastics such as acrylic resins that do not contain any free radical-polymerizable functional groups, waxes or other various additives, including any of the additives conventionally utilized in the coating, sealant, adhesive, molding or ink arts.

Uses for the Inventive Curable Compositions

The inventive curable compositions described herein may be compositions that are to be subjected to curing by means of free radical polymerization or other types of polymerization (e.g., cationic polymerization). End use applications for the inventive compositions include, but are not limited to, inks, coatings, adhesives, 3D printing resins, molding resins, sealants, composites and the like.

Cured compositions prepared from curable compositions as described herein may be used, for example, in three-dimensional articles (wherein the three-dimensional article may consist essentially of or consist of the cured composition), coated articles (wherein a substrate is coated with one or more layers of the cured composition), laminated or adhered articles (wherein a first component of the article is laminated or adhered to a second component by means of the cured composition), composite articles or printed articles (wherein graphics or the like are imprinted on a substrate, such as a paper, plastic or M-containing substrate, using the cured composition).

Curing of compositions in accordance with the present invention may be carried out by any suitable method, such as free radical and/or cationic polymerization. One or more initiators, such as a free radical initiator (e.g., photoinitiator, peroxide initiator) may be present in the curable composition. Prior to curing, the curable composition may be applied to a substrate surface in any known conventional manner, for example, by spraying, knife coating, roller coating, casting, drum coating, dipping and the like and combinations thereof. Indirect application using a transfer process may also be used. A substrate may be any commercially relevant substrate, such as a high surface energy substrate or a low surface energy substrate, such as a metal substrate or plastic substrate, respectively. The substrates may comprise metal, paper, cardboard, glass, thermoplastics such as polyolefins, polycarbonate, acrylonitrile butadiene styrene (ABS) and blends thereof, composites, wood, leather and combinations thereof. When used as an adhesive, the curable composition may be placed between two substrates and then cured, the cured composition thereby bonding the substrates together to provide an adhered article.

Curing may be accelerated or facilitated by supplying energy to the curable composition, such as by heating the curable composition and/or by exposing the curable composition to a radiation source, such as visible or UV light, infrared radiation and/or electron beam radiation. Thus, the cured composition may be deemed the reaction product of the curable composition, formed by curing.

A plurality of layers of a curable composition in accordance with the present invention may be applied to a substrate surface; the plurality of layers may be simultaneously cured (by exposure to a single dose of radiation, for example) or each layer may be successively cured before application of an additional layer of the curable composition.

The inventive compositions described herein are especially useful as 3D printing resin formulations, that is, compositions intended for use in manufacturing three dimensional articles using 3D printing techniques. Such three dimensional articles may be free-standing/self-supporting and may consist essentially of or consist of a composition in accordance with the present invention that has been cured. The three-dimensional article may also be a composite, comprising at least one component consisting essentially of or consisting of a cured composition as previously mentioned as well as at least one additional component comprised of one or more materials other than such a cured composition (for example, a metal component or a thermoplastic component).

A method of making a three-dimensional article using a curable composition in accordance with the present invention may comprise the steps of:
a) coating a first layer of a composition in accordance with the present invention onto a surface;
b) curing the first layer, at least partially, to provide a cured first layer;
c) coating a second layer of the curable composition onto the cured first layer;
d) curing the second layer, at least partially, to provide a cured second layer adhered to the cured first layer and
e) repeating steps c) and d) a desired number of times to build up the three-dimensional article.

Although the curing steps may be carried out by any suitable means, which will in some cases be dependent upon the components present in the curable composition, in certain embodiments of the invention the curing is accomplished by exposing the layer to be cured to an effective amount of radiation (e.g., electron beam radiation, UV radiation, visible light, etc.).

Accordingly, in various embodiments, the present invention provides a process comprising the steps of:
a) coating a first layer of a composition in accordance with the present invention and in liquid form onto a surface;
b) exposing the first layer imagewise to actinic radiation to form a first exposed imaged cross-section, wherein the radiation is of sufficient intensity and duration to cause at least partial curing (e.g., at least 50% curing, as measured by the % conversion of the (meth)acrylate double bonds initially present in the composition) of the layer in the exposed areas;
c) coating an additional layer of the curable composition onto the previously exposed imaged cross-section;
d) exposing the additional layer imagewise to actinic radiation to form an additional imaged cross-section, wherein the radiation is of sufficient intensity and duration to cause at least partial curing (e.g., at least 50% curing, as measured by the % conversion of the (meth)acrylate double bonds initially present in the composition) of the additional layer in the exposed areas and to cause adhesion of the additional layer to the previously exposed imaged cross-section;
e) repeating steps c) and d) a desired number of times to build up the three-dimensional article.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the curable composition or process. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

Example 1

In this Example, the effects of introducing different amounts of an oil-soluble zinc diacrylate into a curable composition in accordance with the present invention were evaluated.

The base (comparative) curable composition (1-A) contained 45% by weight CN966, 55% by weight SR506 and an added 1% of Irgacure® 819 photoinitiator. CN966 and SR506 are commercial products sold by Sartomer having the following compositions:

CN966: a difunctional urethane acrylate oligomer having a molecular weight of about 3000 daltons.

SR506: isobornyl acrylate (a high Tg (meth)acrylate that in homopolymerized form has a Tg of about 94° C., as measured by Dynamic Mechanical Analysis).

Curable compositions 1-B, 1-C and 1-D in accordance with the invention were prepared, as shown in Table 1. The "zinc diacrylate" used in these compositions was obtained by reacting zinc oxide with a 1:1 mixture of acrylic acid and the half-ester formed by reacting hydroxyethyl acrylate with hexahydro-4-methylphthalic anhydride. The structure of the zinc diacrylate may be represented by the following formula:

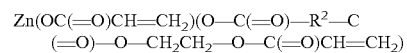

wherein $R^2$ is a 1,4-cyclohexyl moiety substituted with a methyl group at the 4 position.

TABLE 1

| Component | 1-A | 1-B | 1-C | 1-D |
| --- | --- | --- | --- | --- |
| CN966 | 45 wt % | 45 wt % | 45 wt % | 45 wt % |
| SR506 | 55 wt % | 45 wt % | 40 wt% | 35 wt % |
| Zinc Diacrylate | 0 wt % | 10 wt % | 15 wt % | 20 wt % |

The formulations were cured between two pieces of glass to prevent any oxygen inhibition. The samples were cured with two passes at 50 ft/min on a conveyor belt, one on each side, under a 600 W V lamp.

The effects of including increasing amounts of the zinc diacrylate in the curable composition are shown in Table 2.

TABLE 2

| Composition | Strength at break, psi | Young's Modulus, kpsi | Elongation at break, % | Energy at break, ft-lb |
| --- | --- | --- | --- | --- |
| 1-A (Comparative) | 2630 | 24.8 | 402 | 4.7 |
| 1-B | 2990 | 28.8 | 379 | 4.84 |
| 1-C | 3020 | 31 | 335 | 4.53 |
| 1-D | 2655 | 31.8 | 245 | 3.3 |

The inclusion of 10% by weight of the zinc diacrylate in the curable composition 1-B provided a significant increase in the tensile modulus and strength upon curing of the curable composition, in exchange for a slight decrease in elongation. The energy at break therefore increased, due to the presence of the zinc diacrylate. Since impact resistance is a measure of toughness and is directly correlated to energy at break, an increase in this property is therefore expected. Additionally, however, the inclusion of 10% of the zinc diacrylate has increased the reactivity of the formulation by increasing the number of ethylenically unsaturated sites present per mole of monomer and oligomer. This increase in reactivity helps the processing of formulations based on mono-functional monomers.

The invention claimed is:

1. A curable composition comprised of:
   a) at least one salt of at least one ethylenically unsaturated carboxylic acid comprising six or more carbon atoms, wherein the at least one salt comprises at least one polyvalent cation and additionally comprises a carboxylate portion that is not ethylenically unsaturated and/or an ethylenically unsaturated carboxylate portion containing fewer than six carbon atoms
   b) at least one multifunctional (meth)acrylate oligomer and
   c) at least one mono(meth)acrylate ester of an alcohol which, when polymerized as a homopolymer, has a glass transition temperature of at least 50° C. as measured by Dynamic Mechanical Analysis in accordance with ASTM E1640-13.

2. The curable composition of claim 1, wherein the ethylenically unsaturated carboxylic acid is comprised of seven, eight, nine, ten, eleven, twelve, thirteen or more carbon atoms.

3. The curable composition of claim 1, wherein the ethylenically unsaturated carboxylic acid contains at least one functional group selected from the group consisting of acryloyl, methacryloyl, allyl, propenyl and vinyl.

4. The curable composition of claim 1, wherein the ethylenically unsaturated carboxylic acid is a (meth)acrylate-functionalized carboxylic acid.

5. The curable composition of claim 1, wherein the at least one salt comprises at least one zinc or calcium salt.

6. The curable composition of claim 1, wherein the ethylenically unsaturated carboxylic acid is a half ester which is a reaction product of a hydroxy-functionalized ethylenically unsaturated compound and a polycarboxylic acid or carboxylic acid anhydride.

7. The curable composition of claim 1, wherein the salt corresponds to Formula (I):

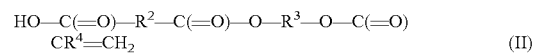

M(OC(=O)CR¹=CH₂)ₓ(O—C(=O)—R²—C(=O)—O—R³—O—C(=O)CR⁴=CH₂)ᵧ   (I)

wherein M is the at least one polyvalent cation and has a valence n, n=x+y, y=an integer of at least 1, R¹ and R⁴ are the same or different and are H or CH₃ and R² and R³ are the same or different and are divalent organic moieties each containing two or more carbon atoms.

8. The curable composition of claim 7, wherein M is selected from the group consisting of Ce, Mg, Ca, Sr, Ba, Ti, Zr, V, Cr, Mo, W, Mn, Fe, Co, Ni, Pd, Cu, Zn, Cd, Hg, B, Al, Ga, In, Si, Ge, Sn, Pb, Sb and Bi.

9. The curable composition of claim 1, wherein the at least one mono(meth)acrylate ester of an alcohol, when polymerized as a homopolymer, has a glass transition temperature of at least 75° C. as measured by Dynamic Mechanical Analysis in accordance with ASTM E1640-13.

10. The curable composition of claim 1, wherein the at least one multifunctional (meth)acrylate oligomer is selected from the group consisting of urethane (meth)acrylates, epoxy (meth)acrylates, polyester (meth)acrylates, polyether (meth)acrylates, polycarbonate (meth)acrylates and combinations thereof.

11. The curable composition of claim 1, wherein the at least one multifunctional (meth)acrylate oligomer comprises at least one di(meth)acrylate-functionalized oligomer.

12. The curable composition of claim 1, wherein the at least one multifunctional (meth)acrylate oligomer has a number average molecular weight of from about 1000 to about 10,000 daltons.

13. The curable composition of claim 1, wherein the alcohol contains at least one of a cyclic structural moiety or a hydroxyalkyl structural moiety.

14. The curable composition of claim 1, wherein the alcohol contains at least one of a cyclic structural moiety selected from the group consisting of aromatic groups and alicyclic groups.

15. The curable composition of claim 1, wherein the alcohol contains at least one of a cyclic structural moiety selected from the group consisting of monocyclic, bicyclic, tricyclic, tetracyclic, pentacyclic and hexacyclic hydrocarbon radicals.

16. The curable composition of claim 1, wherein the alcohol contains at least one of a cyclic structural moiety selected from the group consisting of isobornyl, cyclohexyl, tricyclodecanyl and phenyl.

17. The curable composition of claim 1, wherein the salt is obtained by reacting a M-containing compound, wherein M is the at least one polyvalent cation of an element selected from the group consisting of Ce, Mg, Ca, Sr, Ba, Ti, Zr, V, Cr, Mo, W, Mn, Fe, Co, Ni, Pd, Cu, Zn, Cd, Hg, B, Al, Ga, In, Si, Ge, Sn, Pb, Sb and Bi, with the at least one ethylenically unsaturated carboxylic acid comprising six or more carbon atoms corresponding to Formula (II):

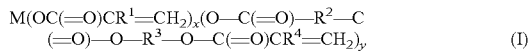

HO—C(=O)—R²—C(=O)—O—R³—O—C(=O)CR⁴=CH₂   (II)

wherein R⁴ is H or CH₃, and R² and R³ are the same or different and are divalent organic moieties each containing two or more carbon atoms.

18. The curable composition of claim 17, wherein the M-containing compound is selected from the group consisting of M-containing oxides, M-containing halides, M-containing alkoxides, M-containing hydroxides, M-containing nitrates, M-containing sulfates, M-containing carboxylates, M-containing carbonates and combinations thereof.

19. The curable composition of claim 17, wherein the M-containing compound is zinc oxide or calcium oxide.

20. The curable composition of claim 17, wherein the salt is obtained by reacting the M-containing compound with both the carboxylic acid corresponding to Formula (II) and (meth)acrylic acid.

21. The curable composition of claim 1, comprising 1 to 25% by weight a), 20 to 55% by weight b) and 25 to 60% by weight c), based on the total weight of a)+b)+c).

22. A method of making a cured article, comprising curing a curable composition in accordance with claim 1.

23. A method of making a three-dimensional article, comprising the steps of:
   a) coating a first layer of a curable composition in accordance with claim 1 onto a surface;
   b) at least partially curing the first layer to provide a cured first layer;
   c) coating a second layer of the curable composition onto the cured first layer;
   d) at least partially curing the second layer to provide a cured second layer adhered to the cured first layer and
   e) repeating steps c) and d) a desired number of times to build up the three-dimensional article.

24. The method of claim 23, wherein the curing steps are performed by exposing the layers of the curable composition to radiation.

25. A cured finished product obtained by curing a curable composition in accordance with claim 1.

26. The cured finished product of claim 25, wherein the cured finished product is selected from the group consisting of coated articles, adhered articles, sealed articles, 2D printed articles, 3D printed articles, composites and molded articles.

\* \* \* \* \*